United States Patent [19]

Espin et al.

[11] Patent Number: 4,899,946

[45] Date of Patent: Feb. 13, 1990

[54] APPARATUS FOR INSPECTION AND REPAIR OF RECORDING TAPE CASSETTES

[75] Inventors: Mario W. Espin; Helen P. Espin; Thomas P. Senn; Harry M. Joyner, Jr., all of Charlotte, N.C.

[73] Assignee: Multi-Video, Inc., Charlotte, N.C.

[21] Appl. No.: 202,474

[22] Filed: Jun. 3, 1988

[51] Int. Cl.$^4$ ............................................. B65H 18/08
[52] U.S. Cl. ........................................ 242/55; 242/76; 242/96; 242/200
[58] Field of Search .......... 242/179, 55, 56 R, 67.1 R, 242/96, 199, 200, 201, 76; 162/271; 226/200; 360/132, 137

[56] References Cited

U.S. PATENT DOCUMENTS 3,999,725 12/1976 Arbib .................................. 242/199
4,390,146 6/1983 Jorephani ........................... 242/200

OTHER PUBLICATIONS

"Tape-Mender TM" Instructions, 1982.

Primary Examiner—David Werner
Attorney, Agent, or Firm—Shefte, Pinckney & Sawyer

[57] ABSTRACT

Apparatus for inspection and repair of recording tape cassettes, particularly videotape cassettes, includes a base having a recess for stationarily receiving the cassette housing and an adjacent channel for receiving and maintaining the tape cover in open dispostion, and a tape advance mechanism having a pair of drive hubs engageable with the tape reels and a clutch release pin simultaneously engageable with the cassette's clutch mechanism to permit manual advance of the tape in either forward or reverse directions. A pair of spindles are mounted on the base in spaced relation to permit a medial extent of the tape to be withdrawn and trained sequentially about the spindles to maintain a portion of the tape transiently exposed for visual inspection during manual advance of the tape. The apparatus is particularly suited for locating and correcting twists, wrinkles, tears, cuts, etc. in the tape of the cassette.

18 Claims, 3 Drawing Sheets

4,899,946

APPARATUS FOR INSPECTION AND REPAIR OF RECORDING TAPE CASSETTES

BACKGROUND OF THE INVENTION

The present invention relates generally to apparatus for facilitating inspection and repair of magnetic and other recording tape cassettes, particularly cassettes of the type having a reel-to-reel tape storage and travel system self-contained within a cassette housing.

The consumer electronics industry has expanded immensely in recent years, due in significant part to the introduction of various audio and audio-visual equipment designed for both playback and recording of audio and/or video electronic signals on magnetic tape. The development and refinement of tape cassettes having a cartridge-type housing wherein a length of recording tape is permanently stored on a pair of rotatable reels, has greatly advanced the convenience and popularity of this equipment. Cassettes of various sizes and tape widths of this basic construction now predominate both the audio and audio-visual segments of the consumer electronics market.

One of the drawbacks, however, of recording tape cassettes is the difficulty in identifying the cause of and repairing malfunctions in the cassette operation, since the cassette housing substantially encloses the tape reels and other working components of the cassette. It is therefore typical to disassemble the housing of a malfunctioning tape cassette to locate and correct operational problems. While it is usually possible to make necessary repairs in this manner, the disassembly and reassembly of the cassette housing can be a time consuming and relatively tedious task and, moreover, is unnecessary when the operational problem is the result of twists, wrinkles, tears, cuts, etc. in the recording tape itself, which could be repaired without housing disassembly by withdrawing the affected section of tape from the housing, splicing or otherwise suitably repairing the tape section, and then properly rewinding the tape onto the reels within the housing. Such a tape withdrawal procedure, however, would itself be difficult to perform because no device or means is currently available by which recording tape can be withdrawn and advanced in an organized fashion outside the cassette housing for inspection and repair procedures.

One device which is currently available on the market is a splicing device produced by Total Video Supply (TVS) of Rancho Santa Fe, Calif., under the trademark "TAPE-MENDER," particularly designed for use with audio-visual tape cassettes. Cassettes of this type are conventionally provided with a pivoted tape cover on the cassette housing which normally covers a portion of the tape extending between the tape reels but may be pivoted to an open position for normal operation of the cassette to expose the tape for recording and/or playback. Also, such cassettes are conventionally provided with an internal clutch mechanism which normally locks the tape reels against rotation but is releasable by engagement through an access opening in the cassette housing to allow reel rotation for cassette recording and playback operation. To accommodate these cassette features, the TVS device provides a cassette support surface having a slotted recess formed therein for holding the tape cover in its open position to expose the tape within the housing extending between the reels, and the device further includes a pin to be inserted into the housing into engagement with the clutch mechanism to enable reel rotation. A separate wheel may then be engaged with one or the other of the reels to actuate forward or reverse movement of the tape between the reels as desired, thereby enabling the tape movement within the housing to be observed. However, other than for purposes of performing splicing operations, the device does not contemplate the withdrawal of the tape from the cassette housing and therefore is not designed for traveling movement of the tape along an inspection path externally of the housing as the tape is being advanced by the hand wheel.

SUMMARY OF THE INVENTION

It is accordingly an object of the present invention to provide an improved apparatus for performing inspection and repair procedures on recording tape cassettes which overcomes the aforementioned disadvantages of the prior art.

Briefly summarized, the apparatus of the present invention comprises a base for supporting the housing of a cassette stationarily during inspection and repair procedures, the base preferably defining a recess configured in conformity to the cassette housing for receiving and retaining the cassette housing in a stationary position during inspection and repair procedures. Suitable means are provided for selectively actuating rotation of the reels of the supported cassette to cause the tape to travel between the reels, the actuating means preferably including a body on which a pair of hubs are rotatably mounted for driving engagement respectively with the tape reels of the cassette together with an associated crank for selectively driving rotation of one hub to cause rotation of the reels and attendant traveling movement of tape for inspection and repair. A positioning arrangement is provided for attaching the body to the base in proper relative position to the recess for engagement of the hubs with the reels of the cassette when the cassette is received within the recess. One preferred embodiment of the present apparatus is specifically adapted for inspection and repair procedures on audio-visual cassettes having a pivoted tape cover. In such embodiment, the base is provided with a channel formed adjacent the cassette recess for receiving and retaining the tape cover in its open position when the cassette housing is received within the recess. Additionally, the actuating means is preferably provided with a clutch release member mounted on the body to engage the clutch mechanism of the cassette simultaneous with driving engagement of the hubs with the cassette tape reels for enabling free rotation of the reels.

According to the present invention, the base may additionally be provided with one or more tape spindles mounted on the base at a spacing from the cassette recess to permit a medial portion of the tape from the cassette to be withdrawn and trained about the spindle or spindles to transiently expose a portion of the tape for inspection during traveling movement of the tape as controlled by the actuating means. In this manner, defects or problems in the tape may be located and repair procedures performed as necessary or desirable. Preferably, a pair of spindles is provided in spaced relation to one another for training of the tape in sequence about the spindles. A tape splicing guide may be mounted on the base to assist in forming splicing cuts in the tape to facilitate repair procedures. The spindle or spindles advantageously facilitate the correction of a twist in the tape which is characterized by a pair of twisted tape areas spaced along the length of the tape. Specifically, the spindle or spindles are disposed on the base at a sufficient spacing both from the recess and from each other to permit any twisted tape area to exit the cassette housing to appear along the exposed tape portion during traveling movement of the tape for inspection. The spindle or spindles permit one twisted tape area, when located, to be positioned and maintained along the transient medial extent of the tape during traveling movement of the tape until the other twisted tape portion is located so that the twist may then be corrected.

DESCRIPTION OF THE PREFERRED EMBODIMENT

Figure 1:
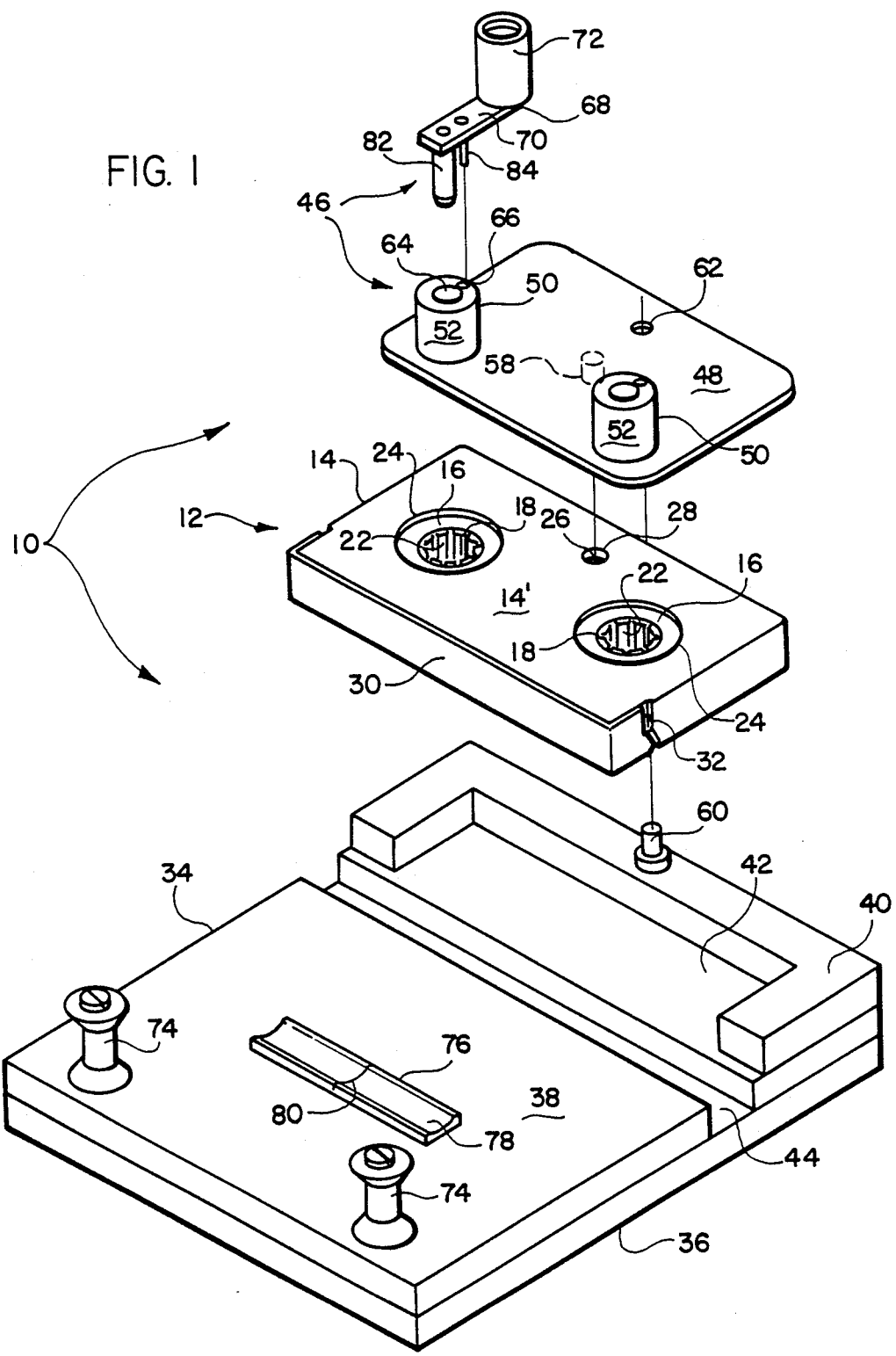
FIG. 1 is an exploded perspective view of the cassette inspection and repair apparatus of the present invention as preferably embodied for use with conventional audio-visual tapes of the VHS format.

Referring now to the accompanying drawings, the cassette inspection and repair apparatus of the present invention, indicated generally at 10 in FIG. 1, is herein illustrated and described as preferably embodied for use with a conventional audio-visual magnetic tape cassette of the VHS operational format, shown generally at 12 in FIG. 1. However, as is well known, audio and audio-visual tape cassettes are conventionally available in other standardized constructions and operational formats. Nevertheless, recording tape cassettes of each type are of generally comparable constructions insofar as each basically comprises a cassette housing containing a pair of rotatable tape reels to which the opposite ends of a length of recording tape are attached and about which the tape is wound for traveling operational playback and recording movement between the reels. Accordingly, it is to be understood that the present invention is fundamentally applicable to all recording tape cassettes of all formats having this basic construction. The present invention is herein described in an embodiment suitable for use with VHS audio-visual tape cassettes purely for purposes of providing a complete and enabling disclosure of the present invention and is not to be construed as a limitation on the scope or substance of the present invention.

With reference initially to FIG. 1, the cassette 12 includes a housing 14 of a box-shaped, rectangular hexahedron construction. A pair of reels 16 are rotatably supported within the housing 14 with the opposite ends of a predetermined length of audio-visual magnetic tape 18 attached respectively to the reels 16 and wound thereabout to permit operational traveling movement of the tape 18 from one reel to the other for recording of audio-visual signals on and signal playback from the tape 18 utilizing a compatible recording-playback apparatus (not shown). Each reel 16 has a central opening 20 presenting a toothed interior circumference 22 which is exposed through a respective circular opening 24 in the bottom wall 14' of the cassette housing 14, whereby the reels 16 may be suitably driven in forward and reverse directions by a drive mechanism of a compatible playback-recording apparatus. The cassette 12 additionally includes an internal clutch mechanism (not shown) which is normally adapted to lock the reels 16 against rotation but is selectively disengageable to permit free rotation of the reels 16 by depression of a release switch 26 accessible through an opening 28 in the bottom wall 14' of the cassette housing 14 generally intermediate the reels 16, performed automatically by a compatible playback-recording apparatus. Finally, the cassette 12 includes a cover or door 30 pivotably mounted to the housing 14 at its front side and being spring-biased into a normally closed disposition covering the extent of the tape 18 extending between the reels 16, while being releasable upon depression of a retaining member 32 for pivotal movement of the cover 30 into an open position (performed automatically by a compatible playback-recording apparatus) to expose the covered portion of the tape 18 for recording thereon or playback therefrom.

The inspection and repair apparatus 10 of the present invention includes a base 34 having a substantially flat bottom surface 36 to be adapted to rest on any suitable table top or similar support surface and presenting an opposite upper work surface 38. One end of the work surface 38 is framed at three sides by elevated border members 40 which cooperatively define a rectangular recess 42 compatibly shaped and sized to the exterior configuration of the cassette housing 14 to permit the cassette 12 to be snugly received and retained stationarily within the recess 42 while resting on the work surface 38. A rectangular channel 44 is formed widthwise across the upper work surface 38 to a sufficient depth into the base 34 below the upper work surface 38 immediately adjacent the recess 42 to enable the cover 30 of the cassette 12 to be received and retained within the channel 44 when the cassette 12 is disposed within the recess 42 with the bottom wall 14' of the cassette housing 14 facing upwardly and the cover 30 released and pivoted relatively downwardly into its open position.

The inspection and repair apparatus 10 additionally includes a reel actuating device, generally indicated at 46, adapted for placement over the upwardly-facing bottom wall 14' of the housing 14 when received by the base 34 as above-described, to enable selective actuation of rotation of the reels 16 to cause the tape 18 to travel between the reels. The actuating device 46 includes a substantially flat plate-like body 48 having a pair of hub members 50 rotatably mounted thereon in identical spaced relation to that of the tape reels 16 of the cassette 12. Each hub member 50 includes an upper cylindrical hub portion 52 disposed at the upwardly-facing side of the body 48 and an integrally rotatable cylindrical drive portion 54 (FIG. 3) depending from the underside of the body 48. The drive portion 54 of each hub 50 includes a drive pin 56 (FIG. 3) extending radially outwardly therefrom for meshing engagement with the toothed interior 22 of a respective one of the reels 16 of the cassette 12. Additionally, the actuating device 46 includes a clutch release pin 58 fixed to and depending from the underside of the body 48 in relative disposition to the drive portions 54 corresponding to the relative dispositions of the reels 16 and the clutch release switch 26 of the cassette 12. A positioning post 60 is fixed centrally to the intermediate border member 40 of the base 34 and a positioning opening 62 is formed in the body 48 in relation to the hubs 50 and clutch release pin 58 thereof for conveniently positioning the hubs 50 and the clutch release pin 58 of the reel actuating device 46 in proper correspondence to the reels 16 and the clutch release switch 26 of the cassette 12 when the body 48 is mounted on the base 34 with the positioning post 60 received through the positioning opening 62.

The reel actuating device 46 also includes a crank assembly 68 which is selectively attachable to and detachable from either of the upper hub portions 52 of the hubs 50 to enable selective driving rotation of either hub 50. The crank assembly 68 includes a crank arm 70 having a handle portion 72 affixed rotatably to one end and a pair of connecting posts 82,84 adjacently depending from the opposite end for receipt within a central opening 64 and a radially adjacent drive opening 66 formed in the upper end of each upper hub portion 52. As will thus be understood, when the reel actuating device 46 is properly positioned as described in engagement with a cassette 12 received in recess 42 of the base 34, the drive portions 54 of the hubs 50 mesh respectively with the cassette reels 16, advantageously maintaining the reels 16 properly centered within the cassette housing, while the clutch release pin 58 simultaneously depresses the clutch release switch 26 of the cassette 12, with the crank assembly 68 enabling either hub 50 to be selectively driven to actuate rotation of the reels 16 and attendant traveling movement of the tape 18 in either forward or reverse direction.

Figure 2:
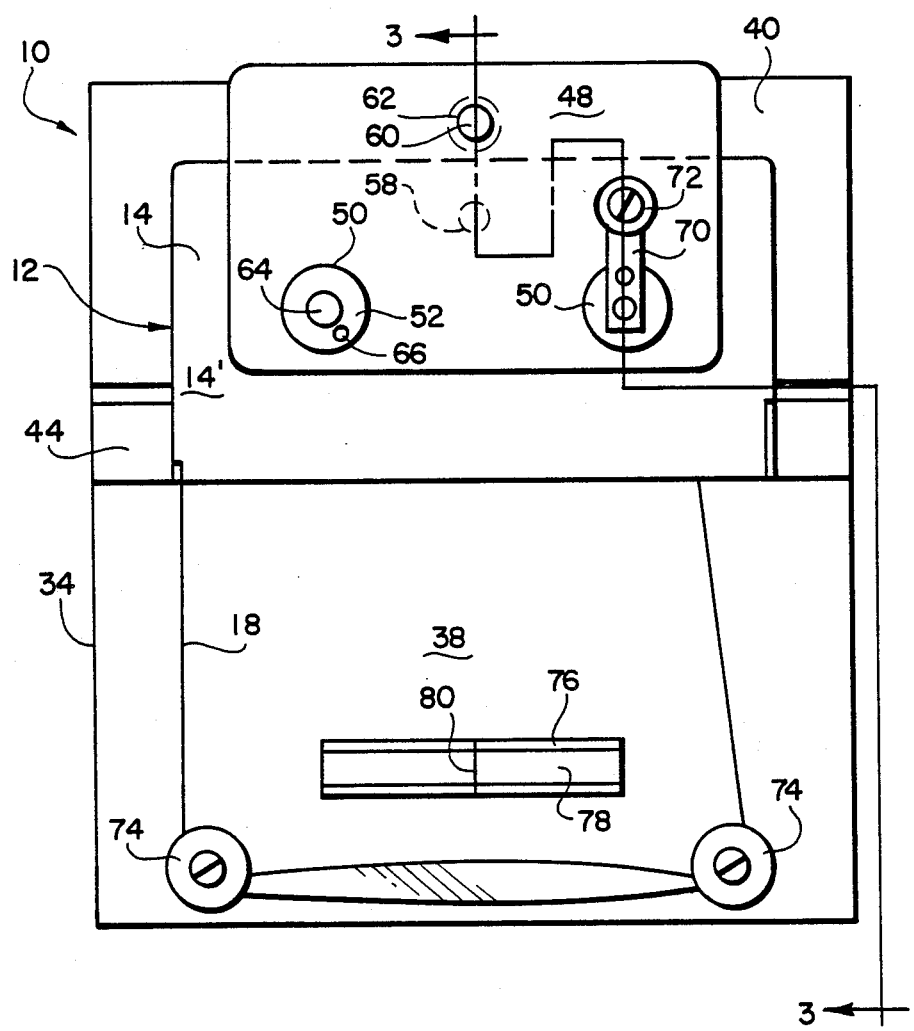
FIG. 2 is a top plan view of the apparatus of FIG. 1.
Figure 3:
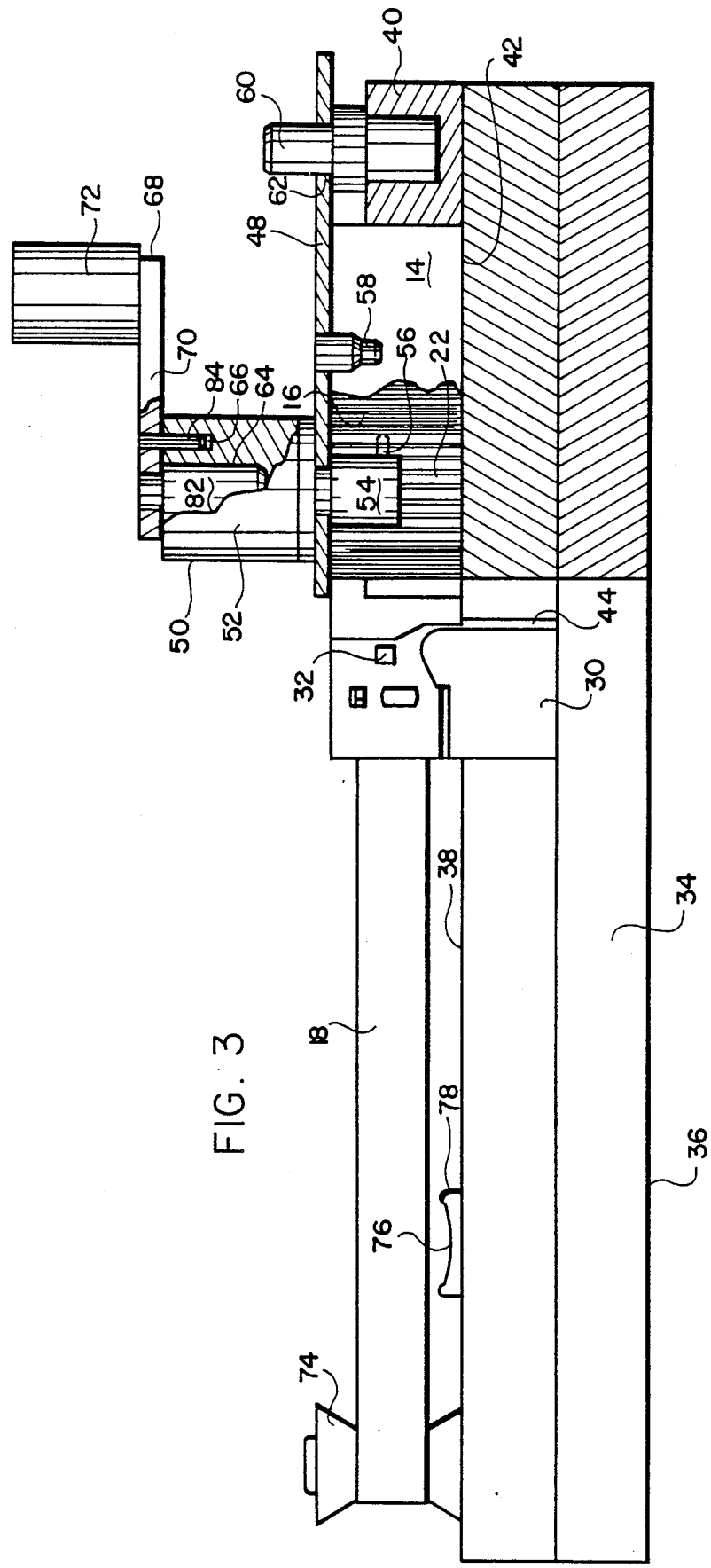
FIG. 3 is a view of the apparatus of FIG. 1, partially in right-side elevation and partially in vertical cross-section taken along line 3—3 of FIG. 2.

One or more, preferably a pair, of spindles 74 are rotatably mounted in upstanding disposition on the upper work surface 38 of the base 34 respectively at the forward corners of the base 34 opposite the border members 40 and the recess 42. In such disposition of the spindles 74, a portion of the tape 18 may be withdrawn from a cassette 12 supported as above-described in the recess 42 of the base 34 and the tape 18 then trained in sequence about the spindles 74, as shown in FIGS. 2 and 3, whereby a medial extent of the tape 18 is always transiently exposed exteriorly of the cassette housing 14 to facilitate visual inspection while the tape 18 is manually advanced by driving rotation of the reels 16 utilizing the actuating device 46. A splicing block 76, having a longitudinally extending tape recess 78 and a transverse tape-cutting slit 80, is affixed centrally to the upper work surface 38 of the base 34 forwardly of the channel 44 to facilitate tape slicing operations as desired.

As will thus be understood, the apparatus 10 of the present invention readily facilitates the performance of various inspection and repair procedures on recording tape cassettes. Thus, when a cassette, such as the cassette 12, is received within the recess 42 of the base 34 with the tape cover 30 opened and received within the channel 44, the actuating device 46 may be conveniently placed in engagement as described on the bottom wall 14' of the cassette housing 14 to automatically release the cassette's clutch mechanism and enable selective driving operation of the cassette reels 16 to advance the tape 18 in either forward or reverse direction. Withdrawal of the tape 18 from the cassette housing 14 and training of the tape 18 about the spindles 74 exposes a sufficient extent of the tape 18 exteriorly of the housing 14 to enable both sides of the entire length of the tape 18 to be visually inspected as it is manually advanced utilizing the crank assembly 68 of the reel actuating device 46. Thus, wrinkles, tears, cuts and other forms of tape defects may be readily located and repaired, if possible, or removed, such as by splicing utilizing the splicing block 76.

Additionally, the spindles 74 uniquely enable twists in the tape 18 to be located and corrected without disassembly of the cassette housing 14. As is known, when a twist develops in the tape of a cassette, the twist results in a pair of twisted tape areas spaced along the length of the tape, sometimes a considerable distance from one another. Thus, in order to correct the twist, both twisted areas must be brought together to eliminate the twist. This, of course, may be an exceedingly difficult and tedious procedure, not only to locate the two twisted areas, but then also to eliminate the twist itself, particularly if the twisted areas are spaced some distance from one another, since this may require a significant length of the tape to be withdrawn from the cassette housing. With the present apparatus 10, however, the tape may be manually advanced from one end to the other with no more than a medial extent of the tape exposed and trained about the spindle 74 for visual inspection. Importantly, the aforedescribed disposition of the spindles 74 at the forward corners of the base 34 locates the spindles in sufficiently spaced relation both to one another and to a cassette supported within the recess 42 of the base 34 to provide a tape path of sufficient length between the cassette and each spindle 74 and between the spindles 74 themselves to allow twisted areas in the tape 18 of the cassette to exist along each portion of the tape path. Thus, any twisted areas of the tape 18 are permitted to exit the cassette housing as the tape 18 is advanced to facilitate location of twists in the tape 18. Once a first twisted area of the tape exits the cassette housing 12 to appear along the exposed medial extent of the tape, such twisted area is positioned between the two spindles 74, thereby causing the transient portion of the tape between the spindles 74 to remain twisted as the tape continues to be advanced and inspected (as shown in FIG. 2) and, accordingly, once the other twisted tape area is withdrawn from the cassette housing, the correction of the twist can be readily completed. As those skilled in the art will recognize, while a single spindle 74 enables the performance of this twist correction procedure as described, provision of a pair of spindles 74 is advantageous in correcting the occurrences of multiple twists.

As aforementioned, it is contemplated that the basic concept and construction of the apparatus of the present invention may be well adapted to substantially any form of self-contained reel-to-reel tape cassette by little more than dimensional changes to accommodate the different shapes and sizes of various conventional cassettes. Morever, it is contemplated that the preferred form of the present apparatus 10 may be modified to allow alternative use with audio-visual tape cassettes both of the conventional VHS format as described and the alternative Beta format. For example, removable space adapters could be provided for defining the cassette housing recess 42 of differing sizes to accommodate cassettes of both formats. Similarly, one of the hubs 50 could be rotatably supported to the body 48 of the actuating device 46 by a slotted connection to enable the hubs 50 to be selectively oriented at differing spacings with respect to one another to accommodate the differing standard spacings between the reels of cassettes of both formats. The clutch release pin 58 similarly could be mounted in a spring-loaded fashion, since Beta format tapes utilize a clutch mechanism which operates in conjunction with the pivoted tape cover, whereby no separate clutch release pin would be necessary with Beta cassettes. For convenience, the connecting posts 82,84 may be mounted on a drill bit adapted for receipt within the chuck assembly of a conventional electric drill so that manual driving operation of the hubs 50 may be avoided if desired, such as when a number of complete cassettes are to be inspected. It is further contemplated that the apparatus 10 could be provided with additional features to enable other repair procedures to be performed. For example, it may be possible to provide heated platens on the work surface of the base 34 intermediate the spindles 74 so that wrinkled portions of the tape 18 could be ironed to remove or reduce the wrinkles.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. Apparatus for performing inspection and repair of recording tape cassettes of the type having a cassette housing, a pair of tape reels rotatably mounted within the housing, and a length of recording tape wound about the reels with one tape end attached to one reel and the other tape end attached to the other reel for traveling movement of the tape between the reels, said apparatus comprising a base for supporting the housing of a cassette stationarily during inspection and repair procedures, means for selectively actuating rotation of the reels of the supported cassette to cause the tape to travel between the reels, and at least one spindle mounted on said base to permit a medial extent of the tape from the cassette housing to be withdrawn and trained about the spindle to transiently expose a portion of the tape for inspection during traveling movement of the tape controlled by said actuating means, said spindle being particularly adapted for locating and correcting a twist in the tape which is characterized by a pair of twisted tape areas spaced along the length of the tape, said spindle permitting one twisted tape area to be positioned and maintained along the exposed tape portion during traveling movement of the tape until the other twisted tape area is located and the twist may then be corrected.

2. Apparatus for performing inspection and repair of recording tape cassettes according to claim 1 and characterized further in that said spindle is disposed on said base to be at a sufficient spacing from a cassette supported on said base to permit any twisted area of the tape of the cassette to exit the cassette housing to appear along the exposed tape portion during traveling movement of the tape for inspection.

3. Apparatus for performing inspection and repair of recording tape cassettes according to claim 2 and characterized further in that a pair of said spindles are disposed on said base in spaced relation to one another for training of the exposed tape portion in sequence about said spindles and to permit the one twisted tape area to be positioned and maintained along the exposed tape portion between said spindles.

4. Apparatus for performing inspection and repair of recording tape cassettes according to claim 1 and characterized further in that said base defines a recess configured in conformity to the cassette housing for receiving and retaining the cassette housing stationarily during inspection and repair procedures.

5. Apparatus for performing inspection and repair of recording tape cassettes according to claim 4 and characterized further in that the cassette includes a tape cover pivotably mounted on the cassette housing for selectively covering a portion of the tape extending between the reels in a closed position of the cover and exposing the tape portion for operation in an open position of the cover, said base including a channel formed therein adjacent said recess for receiving and retaining the tape cover in its open position when the cassette housing is received within said recess.

6. Apparatus for performing inspection and repair of recording tape cassettes according to claim 1 and characterized further in that the reels are exposed at one side of the cassette housing, said actuating means including a body, a pair of hubs rotatably mounted on the body for driving engagement respectively with the reels at the one side of the cassette housing and crank means for selectively actuating driving rotaion of one said hub for causing rotation of the reels and attendant traveling movement of the tape for inspection and repair thereof.

7. Apparatus for performing inspection and repair of recording tape cassettes according to claim 6 and characterized further in that the cassette includes clutch means for selectively locking the reels against rotation and permitting free rotation of the reels, the clutch means being exposed at the one side of the cassette housing adjacent the reels, said actuating means including a clutch release member mounted on said body for engagement with the clutch means of the cassette simultaneously with engagement of said hubs with the reels of the cassette for enabling free rotation of the reels.

8. Apparatus for performing inspection and repair of recording tape cassettes according to claim 6 and characterized further in that said crank means includes a crank handle selectively connectible with each said hub to enable driving of the tape to travel selectively in opposite directions between the reels.

9. Apparatus for performing inspection and repair of recording tape cassettes according to claim 6 and characterized further in that said actuating means includes positioning means for attaching said body to said base in proper relative position to said recess for engagement of said hubs with the reels of the cassette when the cassette is received within the recess.

10. Apparatus for performing inspection and repair of recording tape cassettes according to claim 1 and characterized further by a tape splicing guide mounted on said base to facilitate formation of splicing cuts in the tape of the cassette.

11. Apparatus for performing inspection and repair of recording tape cassettes of the type having a cassette housing, a pair of tape reels rotatably mounted within the housing and exposed at one side thereof, and a length of recording tape would about the reels with one tape end attached to one reel and the other tape end attached to the other reel for traveling movement of the tape between the reels, said apparatus comprising a base for supporting the housing of a cassette stationarily during inspection and repair procedures and means for selectively actuating rotation of the reels of the supported cassette to cause the tape to travel between the reels, said actuating means including a body, a pair of hubs rotatably mounted to the body for driving engagement repectively with the reels at the one side of the cassette housing, and crank means for selectively actuating driving rotation of one said hub for causing rotation of the reels and attendant traveling movement of the tape for inspection and repair thereof.

12. Apparatus for performing inspection and repair of recording tape cassettes according to claim 11 and characterized further in that said crank means includes a crank arm selectively connectible with each said hub to enable driving of the tape to travel selectively in opposite directions between the reels.

13. Apparatus for performing inspection and repair of recording tape cassettes according to claim 11 and characterized further in that said actuating means includes positioning means for attaching said body to said base in proper relative position to said recess for engagement of said hubs with the reels of the cassette when the cassette is received within the recess.

14. Apparatus for performing inspection and repair of recording tape cassettes according to claim 11 and characterized further in that the cassette includes clutch means for selectively locking the reels against rotation and permitting free rotation of the reels, the clutch means being exposed at the one side of the cassette housing adjacent the reels, said actuating means including a clutch release member mounted on said body for engagement with the clutch means of the cassette simultaneously with engagement of said hubs with the reels of the cassette for enabling free rotation of the reels.

15. Apparatus for performing inspection and repair of recording tape cassettes according to claim 11 and characteried further by a spindle mounted on said base to permit a portion of the tape from the cassette to be withdrawn and trained about the spindle to transiently expose a portion of the tape for inspection during traveling movement of the tape controlled by said actuating means.

16. Apparatus for performing inspection and repair of recording tape cassettes according to claim 11 and characterized further in that said base defines a recess configured in conformity to the cassette housing for receiving and retaining the cassette housing stationarily during inspection and repair procedures.

17. Apparatus for performing inspection and repair of recording tape cassettes according to claim 16 and characterized further in that the cassette includes a tape cover pivotably mounted on the cassette housing for selectively covering a portion of the tape extending between the reels in a closed position of the cover and exposing the tape portion for operation in an open position of the cover, said base including a channel formed therein adjacent said recess for receiving and retaining the tape cover in its open position when the cassette housing is received within said recess.

18. Apparatus for performing inspection and repair of recording tape cassettes according to claim 11 and characterized further by a tape splicing guide mounted on said base to facilitate formation of splicing cuts in the tape of the cassette.

* * * * *

UNITED STATES PATENT AND TRADEMARK OFFICE
CERTIFICATE OF CORRECTION

PATENT NO. : 4,899,946

DATED : February 13, 1990

INVENTOR(S) : Mario W. Espin et al

It is certified that error appears in the above-identified patent and that said Letters Patent is hereby corrected as shown below:

Column 8, Line 29, reads "rotaion" but should read -- rotation --.

Column 8, Line 65, reads "would" but should read -- wound --.

Column 10, Lines 4-5, reads "characteried" but should read -- characterized --.

Signed and Sealed this

Fifteenth Day of September, 1992

*Attest:*

DOUGLAS B. COMER

*Attesting Officer*  *Acting Commissioner of Patents and Trademarks*